United States Patent [19]

Goldstein et al.

[11] 4,324,810
[45] Apr. 13, 1982

[54] HOP EXTRACTS AND METHOD OF PREPARATION

[75] Inventors: Henry Goldstein, Brookfield; Walter Fly, Milwaukee; Patrick Ting, Brookfield; Etzer Chicoye, Wauwatosa, all of Wis.

[73] Assignee: Miller Brewing Company, Milwaukee, Wis.

[21] Appl. No.: 154,577

[22] Filed: May 29, 1980

[51] Int. Cl.³ .............................. C12C 3/00; C12C 9/02
[52] U.S. Cl. ........................................ 426/600; 426/16; 426/431; 568/377
[58] Field of Search .................... 426/600, 561 P, 16, 426/431 P; 568/377 P

[56] References Cited

U.S. PATENT DOCUMENTS

| | | | |
|---|---|---|---|
| 3,044,879 | 7/1962 | Koch | 426/600 X |
| 3,558,326 | 1/1971 | Westermann | 426/600 X |
| 3,751,266 | 8/1973 | Kuroiwa | 426/600 X |
| 3,798,332 | 3/1974 | Westermann | 426/600 X |
| 3,839,588 | 10/1974 | Sweett | 426/600 |
| 4,154,865 | 5/1979 | Grant | 426/600 |
| 4,212,895 | 7/1980 | Laws | 426/600 |

Primary Examiner—Robert Halper
Attorney, Agent, or Firm—Quarles & Brady

[57] ABSTRACT

Hop extracts useful in the preparation of anactinic or light stable malt beverages are obtained by a method which does not use organic solvents. The extracts are obtained by first treating a crude hop extract containing humulone with an aqueous reducing solution, heating the resulting mixture to form reduced isohumulone, acidifying the reaction mixture to form an aqueous phase and an organic phase, and then adjusting the temperature to facilitate the separation of the two phases. The organic phase which is obtained contains the desired isomerized and reduced humulone and it can be used per se as an anactinic brew kettle flavoring additive for beer or ale. In a preferred embodiment, the organic phase is further treated with an amount of an aqueous KOH solution sufficient to neutralize the reduced isohumulone and to form both an aqueous phase and a solid phase. The aqueous phase which contains reduced isohumulone of about 90+% purity can be used as an anactinic post-kettle additive and the solid phase which contains the remainder of the reduced isohumulone and other hop constituents can be used as an anactinic brew kettle additive.

9 Claims, 1 Drawing Figure

HOP EXTRACTS AND METHOD OF PREPARATION

The present invention relates to hop extracts which are useful for flavoring malt beverages. More particularly, it relates to novel hop extracts and a method of preparing such extracts without using organic solvents.

BACKGROUND OF THE INVENTION

Hops, in the form of either the ground dried plant or an extract, are used in brewing to give the malt beverages, such as beer or ale, their characteristic bitter flavor and pleasant aroma. The hops or a hop extract may be added to boiling wort in the brewing kettle. An isomerized hop extract, if it is highly purified, may be added post kettle, i.e. after the wort has been boiled or after fermentation.

The primary hop constituents used in the brewing process are the alpha acids, the beta acids, the uncharacterized soft resins and the hop oils. The alpha acids are known as humulones and the beta acids are known as lupulones. The alpha acids are the precursors of the bitter substances in beer. The beta acids or lupulones have low solubility in kettle wort and beer and play a relatively minor role in the brewing process.

During brewing, chemical changes are made in the humulones resulting in the formation of compounds known as isohumulones, i.e., isohumulone, isocohumulone and isoadhumulone. These iso-alpha acids are formed in the kettle during the boiling stage of the normal brewing process and are the primary contributors to the characteristic bitter flavor of beer and ale.

Hop extracts have been used in brewing beer for a number of years. The reasons are several fold. When whole hops are added to the kettle, the yield of isohumulone is poor, e.g. 20-25% based on the humulone present in the hops. However, the conversion of humulones in a hop extract to isohumulones can be very high, e.g. 80%. Furthermore, the utilization of the pure isohumulones in a preisomerized extract which is added post kettle is known to be extremely high, e.g. 70-90%.

In order to use a hop extract post kettle, it must contain isohumulones of a high degree of purity and only insignificant amounts of the other components of a preisomerized extract such as lupulones, waxes and other hop insoluble residues which can cause substantial haze, i.e., turbidity or gushing, i.e., rapid carbon dioxide release.

Extracts containing isohumulones of only 80% purity, for example, cannot be added post kettle in amounts exceeding approximately 10-15 p.p.m. of isohumulone without the possibility of causing turbidity in the finished product. On the other hand, extracts containing isohumulone of high purity, 90%+, can be added post kettle at levels exceeding 20 p.p.m. without a significant increase in turbidity.

It is known that isohumulone derived from hops or an unreduced hop extract can cause light instability in malt beverages. The exposure of such a beer or ale to light can result in the beverage becoming "light struck" and having a skunky odor.

In U.S. Pat. No. 3,044,879, a method is described for preparing a hop extract which when added to beer or ale produces a light stable or "anactinic" malt beverage. The hop extract of the patent is obtained by extracting the flavor active alpha acids or humulones from the hop plant with a low boiling petroleum ether. The thus obtained humulones are then purified by treatment with methanol followed by precipitation as a lead complex, removal of the lead and re-extraction of the humulones from petroleum ether. The humulones in the extract are isomerized and reduced to finally obtain the desired hop extract.

In U.S. Pat. No. 3,798,332 a method is described in which a hop extract, which has been preisomerized and prereduced, dissolved in a water-immiscible organic solvent, e.g. hexane, is treated with aqueous KOH to give an aqueous phase containing 80%+ of the isohumulate present as potassium isohumulate of 90%+ purity. The thus obtained extract can be added to malt beverages post kettle without causing significant amounts of the haze or gushing. The organic phase which is separated from the aqueous phase in the patented process contains the remainder of the isohumulone and other hop constituents. It can be stripped of the organic solvent and added to the brewing kettle as a flavoring agent. Beverages made using either of the hop extracts obtained by the method of U.S. Pat. No. 3,789,332 are light stable or anactinic.

The present invention relates to hop extracts which may be used to prepare anactinic malt beverages and differs from the prior art primarily in that the methods of preparing such extracts is accomplished without using organic solvents.

SUMMARY OF THE INVENTION

It is an object of the present invention to disclose a novel, simple, and inexpensive method of preparing hop extracts without using organic solvents.

It is a further object to disclose novel hop extracts which can be used to prepare anactinic malt beverages.

In the practice of the method of the present invention a crude hop extract, such as obtained by the extraction of the desired constituents from hops, is treated with an aqueous reducing solution, such as a solution of an alkali metal borohydride; the resulting mixture is heated to isomerize and reduce the desired alpha acids; the reaction mixture is acidified; and the temperature of the mixture adjusted to facilitate the separation of an aqueous phase and an organic phase. The organic phase contains the desired isomerized and reduced alpha acids and it can be used per se as an anactinic brewing kettle additive to flavor beer or ale or it can be further treated to produce a water soluble fraction which can be used as an anactinic post kettle additive and a water insoluble fraction which can be used as an anactinic brew kettle additive.

The two fractions are prepared by adding to a separated organic phase prepared as above an aqueous alkaline solution, such as dilute KOH, to solubilize the alpha acids and to form both a water soluble fraction and a water insoluble fraction. The water soluble fraction which may contain about 80% or more of the isomerized reduced alpha acids of 90%+ purity can be used as a post kettle additive for flavoring of malt beverages and the water insoluble fraction which contains the remainder of the alpha acids and other hop constituents can be used as a brewing kettle additive to flavor malt beverages.

The adjustment of the temperature during phase separation is an important step.

When the temperature of the reaction mixture is adjusted to above about 40° C. the two distinct liquid phases can be easily separated. The organic phase, which contains the reduced iso-alpha acids and beta acids, has a lower density than the aqueous phase and may be separated therefrom employing a separatory funnel, a suitable centrifuge or similar equipment.

When the temperature is adjusted to below about 20° C. the organic phase which contains the reduced iso-alpha acids and beta acids has a density greater than the aqueous phase and it sinks to the bottom of the vessel where it can be easily separated by centrifugation or by decantation.

The organic phase obtained by either type of temperature adjustment is then washed and the phases separated as above until all salts and undesirable inorganics, especially those containing boron, are removed. The washed extract may be employed per se as a "anactinic" brewing kettle additive or it may be processed as previously described to obtain two useful fractions.

The practice of the present invention provides for a very easy separation of the desired hop constituents from undesirable material by either of the two described temperature adjustment methods. In general, the purities of the final products obtained are superior to those obtained by prior art methods. In addition, the extraction and purification steps are accomplished easily and without the use of any organic solvents such as was previously taught to be essential.

The elimination of the use of organic solvents has several advantages—the cost of petrochemical solvents is very high and increasing and at times such solvents may be unavailable due to market conditions. Another disadvantage of using petrochemical solvents is that such organic solvents tend to form emulsions with the hop extract and water which are very difficult to break. No such emulsions are formed in the practice of the method of the present invention. Still another unexpected advantage is that the borohydride reduction goes to completion with greater facility when no organic solvent is present.

The method of the present invention employs only aqueous solvents. In fact, when the crude extract employed as the starting material is obtained by the carbon dioxide extraction of hops no solvents are used which are foreign to the brewing process in the entire hop extraction and purification process. The method of the present invention even eliminates the need to use ethanol which is not foreign to the brewing process but is expensive and requires government regulations for use.

There also are advantages resulting from the practice of the modification of the method which produces the two fractions useful as brewing additives. In the prior art patented processes, the separation of the crude hop extract into a fraction that could be added to the brewing kettle and a second fraction that could be added post-kettle, was accomplished by the partitioning of the isohumulone between an aqueous phase and an organic solvent phase. In the modification of the method of the present invention no such partitioning occurs. The separation is accomplished as a result of either the relative differences of solubilities of the potassium isohumulate and other hop impurities including the beta acids in the aqueous phase or the differences in the pKa's of the various hop components. The concentration of the reduced isohumulone in the two fractions can be controlled by controlling the concentration of the KOH or the pH. As a result the purity of the fraction which is used post-kettle can be greater than 95 percent.

These and still other objects of the invention will be apparent from the description which follows.

DESCRIPTION OF THE PREFERRED EMBODIMENT

Figure 1:
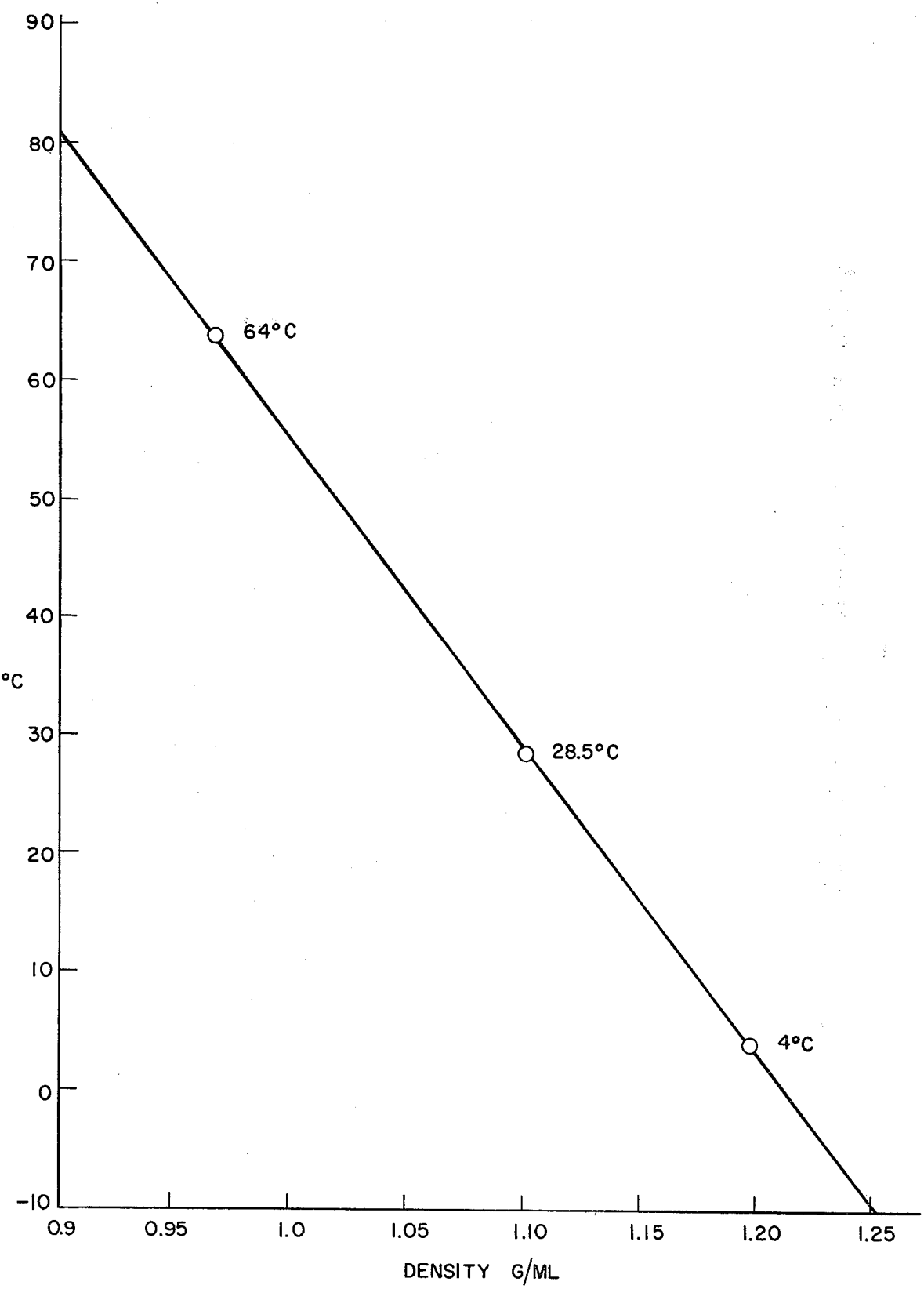

In the preferred practice of the present invention a crude extract of hops, obtained by the carbon dioxide extraction of hops, is added to an aqueous solution of sodium borohydride and sodium hydroxide. The mixture is heated at about 60 degrees to about 65 degrees C. for about three hours with stirring to isomerize and reduce the alpha acids or humulones. The reaction mixture is then cooled to about 45 degrees C. and acidified with $H_2SO_4$ to a pH below about 2. The mixture is then once again heated with agitation to about 60 degrees C. whereupon two free flowing liquid phases are obtained. The organic liquid phase which forms has a density less than the aqueous phase and can be separated from the aqueous phase by use of a separatory funnel. The organic phase is then washed with water or dilute sulfuric acid at about 60 degrees C. to remove any inorganic salts or boron compounds. The organic phase is then again separated from the aqueous phase as above.

In an alternative embodiment of the method, the reaction mixture after acidification is cooled to about 10 degrees C. to form a liquid aqueous phase and a semi-solid organic phase which has a density greater than the aqueous phase. The organic phase is then preferably separated from the aqueous phase by decantation.

Either of the thus obtained hop extracts can be used per se as a brewing kettle additive for the preparation of an anactinic malt beverage.

The extracts obtained by the above described method can be further treated to yield the two useful fractions. One fraction is suitable for use as a post-kettle additive and the other fraction is suitable for use as a brew kettle additive.

The production of the two described fractions is accomplished by further treating an extract obtained by the practice of the preferred method or the alternative method with an aqueous alkaline solution, such as, a caustic solution of 6 N KOH, to form soluble salts of the reduced iso-alpha acids. The aqueous phase is then separated from the insoluble residual material by the methods described above. The aqueous phase is useful as an anactinic post-kettle additive and the organic residual material is useful as an anactinic brew kettle additive.

The relative amounts of reduced isohumulone in the two phases can be changed by adjusting the amount of KOH added. For example, if one mole of potassium hydroxide is added per mole of alpha acid, 80–85% of the isomerized and reduced product dissolves in the aqueous phase (with a purity of 99+%). Greater amounts and lesser purity is obtained if greater amounts of KOH are used.

The separation occurs due to the relative solubilities of potassium isohumulate and other hop impurities including beta acids in the alkaline phase or the differences of pKa's of the various hop components. The process thus depends on the solubility of reduced isohumulone (or the potassium salt of reduced isohumulone) in potassium hydroxide solution and not the partitioning of reduced isohumulone between an organic solvent (hexane) phase and an alkaline aqueous phase as in the prior art patented process. For this reason more reduced isohumulone can be dissolved into the aqueous phase at a higher purity. By changing the concentrations of the KOH (or the pH), the amount of dissolved reduced isohumulone in the aqueous phase and the amount of undissolved isohumulone can be adjusted to obtain an aqueous fraction having isohumulones of a purity greater than 95% which is useful as an anactinic post-kettle additive that does not cause "haze" and "gushing".

The crude hop extract employed as the preferred starting material for the method of the present invention is prepared by passing liquid carbon dioxide through a column of hops. The preferred extract, in addition to not containing any residual hydrocarbon solvent, appears to contain more of the desirable hop constituents and less of the undesirable, difficult-to-remove hop constituents than extracts prepared using an organic solvent such as hexane. However, extracts prepared by use of organic solvents and aqueous solvents may also be used.

The alpha acids are preferably isomerized and reduced with an aqueous mixture of sodium borohydride and sodium hydroxide or potassium borohydride and potassium hydroxide.

The practice of the invention is further illustrated by the following examples.

EXAMPLE 1

A $CO_2$ extract of Yakima Cluster hops was found to contain 46.68% alpha acids and 32.97% beta acids by standard spectrophotometric analysis. To 50 ml of an aqueous solution (which was heated to 60 degrees) containing 0.272 g (4.84 m moles) of potassium borohydride and 1.29 g (23 m moles) of KOH was added 5.0 g of the above $CO_2$ extract (containing 6.45 m moles of alpha acids and 3.93 m moles of beta acid). After heating at 60-65 degrees C. for three hours with stirring, the solution was cooled in a cold water bath and acidified with 10 ml of 6 N HCL to a pH of 2. This mixture was then heated again to 60 degrees in a water bath with constant shaking whereupon the reduced hop extract became a free flowing liquid. The material was centrifuged at 2000 RPM's at temperatures exceeding room temperature and the organic liquid phase was separated from the aqueous phase in a separatory funnel. The organic phase was washed three times with about 25 ml of water maintaining the temperature at 60 degrees C. After cooling, a yellow semi-solid material was obtained that was useful as an anactinic brew kettle additive.

EXAMPLE 2

To 50 ml of an aqueous solution containing 0.209 g of sodium borohydride (4.84 m moles) and 0.920 g NaOH (23.0 m moles) was added 5.0 g (6.54 m moles alpha acids and 3.93 m moles beta acids) of the $CO_2$ extract of Example 1. The mixture was heated at a temperature 60 degrees and 65 degrees C. for three hours with stirring. The solution was worked up as in Example 1. A yellow solid was obtained that was useful as an anactinic brew kettle additive.

EXAMPLE 3

To a sample of 5 g of the same $CO_2$ extract as in Example 1 was added 1.80 ml of SWS (a commercial stabilized water solution containing sodium borohydride) and 38.2 ml of water. The mixture was heated to 60 degrees. The reaction, separation and work-up was as in Examples 1 and 2. The yellow solid obtained was suitable for use as an anactinic brew kettle additive.

EXAMPLE 4

A sample of 51.9 g of a $CO_2$ extract of hops (23.6 g alpha acid) was added to a solution of 500 ml of water plus an amount of stabilized water solution of sodium borohydride (commercial SWS) sufficient to provide at least 2 equivalents of NaOH plus 10% excess per mole of hop acids and 75% of an equivalent of $NaBH_4$ per mole of alpha acid only. The mixture was agitated for three hours at 60-65 degrees C. The reaction mixture was then slightly cooled and the pH was adjusted to less than 2 with a solution of 1:1 sulfuric acid. This mixture was warmed to temperatures between 60-65 degrees with agitation for 10 minutes and subjected to centrifugation at approximately 10 degrees C. The aqueous phase was then separated from the product by decantation. To the organic phase was then added 250 ml of 2% sulfuric acid and the mixture was warmed to 60-65 degrees with agitation for 10 minutes. The mixture was cooled to about 20° C., to form two phases. The organic phase and aqueous phase were separated by centrifugation with cooling and decantation. The organic phase was suitable for use as an anactinic brew kettle additive.

EXAMPLE 5

A mixture containing 27.5 g of the product from Example 4, 185 ml of water and 31 ml of 1 N KOH was heated to 60-65 degrees C. for 30 minutes with agitation. The amount of KOH used was just sufficient to neutralize the reduced isohumulone. The aqueous and organic phases were separated by the methods described above. The aqueous phase solids were 96% pure reduced isohumulone and 82.7% of the available reduced isohumulone was transferred to the aqueous phase. The aqueous phase was suitable for use as dilute an anactinic post kettle additive and the organic phase was suitable for use as an anactinic kettle additive.

| | Analytical Results | | | |
|---|---|---|---|---|
| | Starting Material | Aqueous Phase | Organic Phase | % accounted for |
| Solids | 27.5 g | 9.7 g | 17.0 g | 97% |
| Reduced Isohumulone | 11.3 g | 9.3 g | 2.6 g | 106% |
| Lupulone | 6.9 g | 0.15 g | 6.3 g | 93% |

EXAMPLE 6

One hundred sixty grams of a carbon dioxide extract of hops plus 720 mls of water and 45 mls of a stabilized water solution of sodium borohydride and sodium hydroxide was heated at 60° to 65° C. for three hours with agitation.

The mixture was cooled below 20° C. and the organic phase settled to the bottom of the container as a solid waxy mass. Phase separation was accomplished by decantation. The organic material phase was suitable for use as an anactinic brew kettle additive. The phase separation upon cooling was not expected. Density determinations of the isomerized and reduced solid extract were conducted, and it was found that the density changed from a density value of less than water at 64° C. to one which is to greater than water at 4° C. (See the Table which follows and FIG. 1) As a result phase separations of the reaction mixture could both be easily accomplished by a liquid-liquid separation at 60° C. and by a liquid-solid separation at 4° C. using suitable centrifuges.

TABLE

| | Calculated Density of Hass Seeded Bullion Isomerized and Reduced Extract | | |
|---|---|---|---|
| | (1) +4° C. | (2) 28.5° C. | (3) 64° C. |
| weight flask & sample | 32.40486 | 23.66585 | 27.58056 |
| weight flask | 29.35560 | 20.39554 | 23.59719 |
| weight sample | 3.04926 | 3.27031 | 3.98337 |
| flask & H$_2$O & sample | 54.85551 | 45.69281 | 48.45721 |
| weight water | 22.45065 | 22.02696 | 20.87665 |
| volume of H$_2$O | 22.46230 | 22.11286 | 21.27836 |
| volume of sample | 2.54935 | 2.97304 | 4.12335 |
| density sample | 1.1961 | 1.0999 | 0.9661 |
| | 1.196 | 1.100 | 0.966 |

EXAMPLE 7

Sixty grams of the solids of the organic phase of Example 6 plus 410 mls of water and 60 mls of 1 Normal KOH were heated at 60° to 65° C. for 30 minutes with agitation. The amount of water and KOH used was just sufficient to neutralize the reduced isohumulone.

The mixture was cooled as in Example 6 and separated by centrifugation. The aqueous phase solids contained 99.4% of the reduced isohumulone and 82.1% of the available reduced isohumulone. The aqueous phase was suitable for use as an anactinic post-kettle additive and the organic phase was suitable for use as an anactinic brew kettle additive.

EXAMPLE 8

Two hundred fifty grams of a hexane extract of seeded Bullion hops were added to a mixture of 1000 ml of water and 68 grams of a stabilized water solution of NaBH$_4$ and NaOH and heated for 3 hours with agitation. The mixture was cooled and acidified as in Example 1, chilled to about 20° C. whereupon two phases separated. The aqueous solution was separated from the organic phase by decantation. The organic phase was washed once with 500 ml of 2% sulfuric acid and once with 500 ml of water (both for 30 minutes at 60-65degrees C.). The organic phase was suitable for use as an anactinic brew kettle additive.

EXAMPLE 9

To a solution of 75 ml of 1 N KOH and 550 ml of water was added 114 g of the organic phase of Example 8. The amount of dilute KOH solution was that calculated to be just sufficient to neutralize the reduced isohumulone. The mixture was heated at 60-65 degrees C. for 30 minutes with agitation. This was followed by separation by cooling to 20° C., centrifugation and decantation. Both the aqueous and organic phases are useful as hop flavoring additives—the aqueous phase as a post-kettle additive and the organic phase as a brew kettle additive. The aqueous phase and organic phase were analyzed and the results are presented below.

| ANALYTICAL RESULTS U.V. analysis results are in grams of material | | | | |
|---|---|---|---|---|
| | Starting Material | Aqueous Phase | Organic Residues | % Accounted for |
| Solids | 114.3 | 20.8 | 92.9 | 99.5% |
| Reduced Isohumulone | 38.1 | 19.7 | 21.7* | 108.7% |

| ANALYTICAL RESULTS U.V. analysis results are in grams of material | | | | |
|---|---|---|---|---|
| | Starting Material | Aqueous Phase | Organic Residues | % Accounted for |
| Lupulone | 19.9 | 0.2 | 17.1 | 86.9% |

*This value is very high due to large amounts of unknown compounds.

It will be apparent to those skilled in the art that the method of the present invention, in addition to being novel and useful, also is unobvious as it eliminates the need to employ the organic solvents previously considered essential to prepare a hop extract for use in making an anactinic malt beverage. The method is also simple and economical. For example, only conventional separation techniques and equipment are used and none of the potentially useful flavoring constituents of the original hop extracts starting materials are wasted.

It will be apparent to those skilled in the art that a number of modifications and changes may be made without departing from the spirit and scope of the invention. Therefore it is to be understood that the invention is not to be limited by the description and examples but only by the claims which follow:

We claim:

1. A method of preparing a hop preparation containing reduced isohumulone without using added organic solvents, said method consisting of:
    a. adding an aqueous reducing solution to a crude extract of hops which is substantially free of hydrocarbon solvents and contains humulone;
    b. heating the resulting mixture to isomerize and reduce the humulone;
    c. acidifying the reaction mixture to cause an aqueous phase and an organic phase to form;
    d. adjusting the temperature of the reaction mixture to facilitate the separation of the aqueous and the organic phases; and
    e. then isolating the organic phase which contains the desired reduced isohumulone.

2. The method of claim 1 in which the temperature is adjusted to above about 40 degrees C. to facilitate the separation of the aqueous phase and the organic phase which has a density less than water.

3. The method of claim 1 in which the temperature is adjusted to below about 20 degrees C. to facilitate the separation of the aqueous phase and the organic phase which has a density greater than water.

4. A hop preparation prepared by the method of claim 1 which is free of added organic solvents, contains reduced isohumulone and is useful in the preparation of anactinic malt beverages.

5. The method of claim 1 in which the organic phase containing the reduced isohumulone is further treated with a measured amount of an aqueous alkaline solution which is effective to solubilize the reduced isohumulone and to form a water soluble fraction which contains reduced isohumulone of 90+% purity and a water insoluble fraction which contains the residual reduced isohumulone and other hop constituents.

6. A water soluble fraction prepared by the method of claim 5 which is free of added organic solvents, contains reduced isohumulone of 90+ purity and is useful in the preparation of an anactinic malt beverage.

7. A water insoluble fraction prepared by the method of claim 5 which is free of added organic solvents, contains the residual reduced isohumulone and is useful as an anactinic brew kettle additive.

8. A method for preparing a hop preparation containing isomerized and reduced alpha acids, including reduced isohumulone, without using added hydrocarbon solvents which comprises:

a. treating an extract of the active constituents of hops which is substantially free of hydrocarbon solvents and contains alpha acids, with an aqueous alkaline solution of an alkali metal borohydride;

b. isomerizing and reducing the alpha acids;

c. acidifying the resulting mixture to cause an aqueous phase and an organic phase to form; and d. then adjusting the temperature of the mixture to facilitate the separation of the aqueous phase and the organic phase which contains the isomerized and reduced alpha acids.

9. The method of claim 8 in which the organic phase containing the isomerized and reduced alpha acids is further treated with an amount of aqueous potassium hydroxide solution which is just sufficient to neutralize the reduced isohumulone to form a water soluble fraction containing reduced isohumulone of 90+% purity and a water insoluble fraction containing the insoluble residual material which contains the remainder of the reduced isohumulone, and then isolating the water soluble fraction from the water insoluble fraction.

* * * * *